(12) United States Patent
Hoppe et al.

(10) Patent No.: US 6,749,925 B2
(45) Date of Patent: *Jun. 15, 2004

(54) DATA CARRIER

(75) Inventors: Joachim Hoppe, Munich (DE); Yahya Haghiri-Tehrani, Munich (DE); Arno Hohmann, Munich (DE); Josef Strassmaier, Emmering (DE); Wolfgang Gauch, Otterfing (DE); Matthias Bergmann, Vogtareuth (DE); Gustav Dax, Heufeld (DE)

(73) Assignee: Giesecke & Devrient GmbH, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/836,204

(22) PCT Filed: Nov. 17, 1995

(86) PCT No.: PCT/EP95/04528
§ 371 (c)(1),
(2), (4) Date: Jul. 16, 1997

(87) PCT Pub. No.: WO96/15912
PCT Pub. Date: May 30, 1996

(65) Prior Publication Data
US 2003/0096084 A1 May 22, 2003

(30) Foreign Application Priority Data
Nov. 18, 1994 (DE) .......................................... 44 41 198
Aug. 18, 1995 (DE) .......................................... 195 30 495

(51) Int. Cl.[7] .............................................. B42D 15/00
(52) U.S. Cl. .................... 428/167; 428/67; 428/162; 428/163; 428/169; 451/42; 451/255; 451/256; 451/277; 451/323; 283/72
(58) Field of Search ........................ 451/42, 255, 256, 451/277, 323; 283/904, 72, 86, 87, 88, 89, 94; 428/167, 169, 67, 162, 163

(56) References Cited

U.S. PATENT DOCUMENTS

| | | | | |
|---|---|---|---|---|
| 3,770,479 A | * | 11/1973 | Dunning | 428/151 |
| 4,415,612 A | * | 11/1983 | Hall et al. | 428/29 |
| 4,459,784 A | * | 7/1984 | Hernandez et al. | 51/216 LP |
| 4,556,588 A | * | 12/1985 | Rockwood | 428/13 |
| 4,655,005 A | * | 4/1987 | Roberts | 51/124 L |
| 4,765,656 A | * | 8/1988 | Becker et al. | 283/70 |
| 4,856,857 A | * | 8/1989 | Takeuchi et al. | 350/3.6 |
| 4,921,319 A | * | 5/1990 | Mallik | 359/1 |
| 4,955,937 A | * | 9/1990 | Dona et al. | 82/1.11 |
| 5,468,540 A | * | 11/1995 | Lu | 428/156 |

FOREIGN PATENT DOCUMENTS

| | | | |
|---|---|---|---|
| WO | WO 94/27254 | * | 11/1994 |
| WO | WO 97/24715 | * | 7/1997 |

* cited by examiner

Primary Examiner—Sandra M. Nolan
Assistant Examiner—Alicia Chevalier
(74) Attorney, Agent, or Firm—Bacon & Thomas, PLLC (57) ABSTRACT

The invention relates to different methods for distortion-free production of data carriers having at least in partial areas a transparent plastic layer with a surface structure in the form of a lens structure. The surface structure can be produced by cutting method or embossed by applying heat and pressure. Alternatively the surface structure can be produced as a separate element which is connected after its production with the data carrier.

22 Claims, 8 Drawing Sheets

DATA CARRIER

BACKGROUND OF THE INVENTION

Field of the Invention

This invention relates to a method for producing a data carrier having at least in partial areas a transparent plastic layer which is provided at least in a partial area with a surface relief in the form of a lens structure. Further the invention relates to a data carrier produced by this method and to an apparatus for carrying out the method.

There have been efforts for some time to provide data carriers such as ID cards, credit cards or papers of value with special security features having a striking, uncopiable visual effect, on the one hand, and ensuring cost-effective production, on the other hand.

For example, EP 0 219 012 A1 discloses a multilayer data carrier with a transparent cover foil in which a surface relief in the form of a lens structure, preferably a cylinder lens screen, is incorporated. Through this lens screen information is incorporated by means of a laser in subjacent volume areas of the data carrier, being visually well recognizable as blackened areas. By reason of the focal effect of the lenses, only narrowly limited areas of the data carrier are blackened so that the information can only be observed at the viewing angle corresponding to the angle of incidence of the laser on the lens structure. In this way one can inscribe several pieces of information recognizable only at certain viewing angles by using different inscription angles. This effect will be called a "tilt image" in the following.

This tilt image has a variety of security-related advantages. For example it is reproducible neither with photographic means nor with copying technology, since the tilt image information is never all present at one camera angle simultaneously. The false data carrier consequently only shows one part of the information and this at all viewing angles. The tilt image effect has vanished. Moreover the laser inscription offers additional protection from forgery. Laser inscription produces visible changes in the interior of the data carrier material that cannot be removed or altered either chemically or mechanically without completely destroying the data carrier.

SUMMARY OF THE INVENTION

This security feature also offers some advantages with respect to economical production of data carriers. Inscription of the lens screen area takes place only after completion of the data carrier, so that any rejects that occur are not inscribed and complicated runs for subsequently producing a new data carrier with the same data record are therefore avoided. This holds in particular if the tilt image information is user-related.

The lens structure was hitherto produced by embossing with an embossing die either during production of the data carrier or after its completion. However the heating of the data carrier material and the pressure exerted thereupon can easily cause irreparable distortions and disturbing embossings through to the back of the data carrier, which is frequently used as a printing surface.

Therefore the lens structures are preferably incorporated during lamination of the data carriers by providing one of the laminating plates with the negative lens screen structure. Since lamination is usually done in sheet format, the laminating plate must have the suitable negative relief structure in the area of each individual copy. This has the disadvantage that the entire laminating plate must be replaced as soon as an error occurs in the area of one copy.

The invention is therefore based on the problem of proposing a method for providing data carriers with surface structures, in particular lens structures, without distortions and economically even in short runs without the stated disadvantages of the prior art.

Solutions to this problem are stated in the independent claims. Developments can be found in the respective subclaims.

According to a preferred embodiment the relief structure is incorporated with the aid of accordingly formed cutting tools, such as planing or grinding tools, in the data carrier consisting of a transparent plastic in the area of the lens structure to be incorporated. As apparent from polished samples, this removal method can produce a very smooth lens surface with good optical quality. This method is suitable for all conventional data carrier materials, in particular thermostable materials such as PC with which usual embossing methods cannot be applied. By reason of the material removal, the data carrier produced by this method has a lens structure slightly sunk in from the data carrier surface, i.e. the thickness of the data carrier is not altered by the lens structure as with known data carriers. This fact is of great advantage in particular for stacking the inventive data carriers. By sinking or quasi embedding the lens structure in the data carrier one moreover protects the lens surface optimally against wear due to environmental influences.

According to a further embodiment one can also use individual matrixes working on a given stepwise heating and pressure cycle in order to avoid distortions of the data carrier material. For this method one preferably uses an apparatus having several embossing units working in parallel. When an individual data carrier runs into the apparatus an embossing die is mounted on the data carrier, being jointly moved with the card along a given, for example circular, transport path. During transport through the embossing apparatus the jointly moved embossing die is heated in accordance with the given working cycle and cooled after the data carrier material has slowly softened and been put in the desired form. Jointly moving the heating and cooling device has the advantage that the entire transport time can be utilized as process time. Alternatively the heating/cooling device can also be stationary, however, which has the advantage that the temperature can be adjusted in central and stationary fashion for the entire apparatus. The data carriers are thereby clocked through the stationary heating/cooling units together with the mounted embossing dies.

The option of being able to control the temperature and pressure cycle within wide limits without having to accept any great disadvantages with respect to productivity, also makes it possible to produce by this method data carriers wherein the lens structure leads to no increase in the data carrier thickness. Due to the slow change of state the data carrier material can be deformed very uniformly and without distortions and the surplus data carrier material distributed uniformly over the entire data carrier.

In order to minimize the risk of distortions further, one can provide the data carrier surface before the embossing process with a layer of lacquer which is thermoplastically deformable during embossing and only completely cured afterwards. The cured lacquer layer acts as a kind of fixing layer for the subjacent thermally softened zone of the data carrier material, which can cool off completely without distortion after the actual embossing process and cure in the form given by the lacquer layer. However it is also possible to emboss only into the lacquer layer. In this case the danger of distortions is averted completely since the data carrier material itself is not stressed during embossing.

If the data carrier is to be equipped with a locally limited tilt image element, distortions and signs of wear can also be avoided by producing the tilt image element as a separate single element and then incorporating it into an accordingly dimensioned gap in the data carrier.

The lens element can be produced for example by a continuous embossing method wherein a transparent foil is provided with the desired structure by web-fed embossing. It is likewise conceivable to equip the foil with the suitable surface contour already during extrusion. The foil is then punched into the single elements and fastened in the data carrier gap by gluing or welding for example. A further possibility is offered by injection molding, with which single elements of the desired form can be produced directly.

Embodiments are also possible in which the data carrier or parts thereof are produced by injection molding. For example one can injection mold a data carrier having the lens structure locally limited on one of its surfaces, the apex areas of the lens structure preferably ending flush with the data carrier surface. On the opposite side of the data carrier one provides below the lens structure a gap in which a separately produced plastic element is inserted. This element is specially adapted to the requirements of laser inscription since either the element material is mixed with additives which absorb laser radiation, or the element is coated with an accordingly prepared lacquer layer on the side facing the data carrier.

A further variant is to injection mold a plastic foil at least on one side with a translucent layer having the lens structure in a partial area. If the foil is provided by injection molding with a cover layer on both sides, the second cover layer can also have a lens structure in a certain area. In a special embodiment the lens structures can be disposed congruently or at least concentrically with each other. If necessary the plastic foil can be provided, before the cover foils are applied, with a coating sensitized for absorbing laser radiation in the area of the lens screen to be applied.

The latter methods can do completely without complicated and elaborate embossing apparatuses within the production line of the data carriers. This permits more economical and efficient production. Producing continuously embossed foils or injection molding single elements is cost-effective since one can do long runs in a continuous process that need only be adapted to the boundary conditions for this one process. There are so longer problems such as embossing through to the back of the data carrier or distortions.

The inventive methods further have the advantage that they can be performed on the card when its layer structure is finished, so that problems with rejects are easy to handle. If a processing step has been improperly executed the data carrier in question can be immediately eliminated and replaced with a following one.

Further advantages and advantageous embodiments will be explained with reference to the figures. It is pointed out that the figures only sketch the essential method steps and are not to be understood either as complete or as true-to-scale representations of the individual apparatuses.

DETAILED DESCRIPTION OF THE PREFERRED EMBODIMENTS

Figure 1:
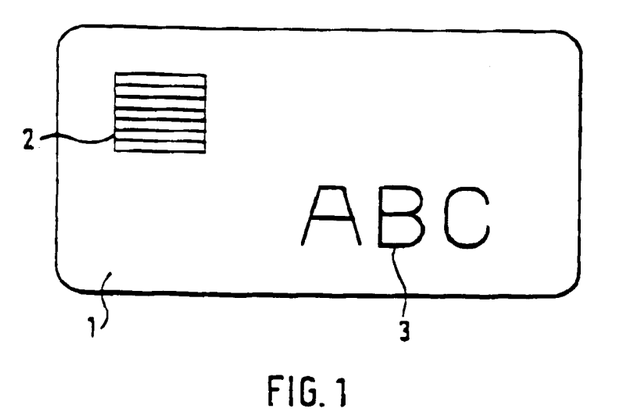
FIG. 1 shows a data carrier with a tilt image.

FIG. 1 shows data carrier 1 according to the invention. It can be a one- or multilayer ID card whose body is produced by one of the known methods, such as extrusion, lamination or injection molding, and which is provided with usual data 3, such as the name of the user, an account number and general data relating to the issuing institute. The user-related data are preferably burned into the inner volume area of the ID card with a laser, while the general information, such as that relating to the issuing institute, is printed on one of the card layers by a printing process. In addition the data carrier can also have other, solely machine-readable data storage mechanisms, such as an integrated circuit or magnetic strip. As shown in FIG. 1, inventive data carrier 1 additionally has in a partial area an optical authenticity feature in the form of tilt image 2. As explained above, tilt image element 2 consists of a lens structure, which can involve cylinder and/or spherical lenses that can be either directly adjacent one another or disposed in accordance with a given pattern and are incorporated into a plastic layer transparent at least in partial areas. The focal lengths of the individual lenses can additionally be varied, for example in accordance with a given pattern. Tilt image element 2 can of course also extend over entire data carrier 1.

According to a first embodiment, the lens structure is incorporated into one of the data carrier surfaces with the aid of cutting tools, such as grinding or planing tools.

Figure 2:
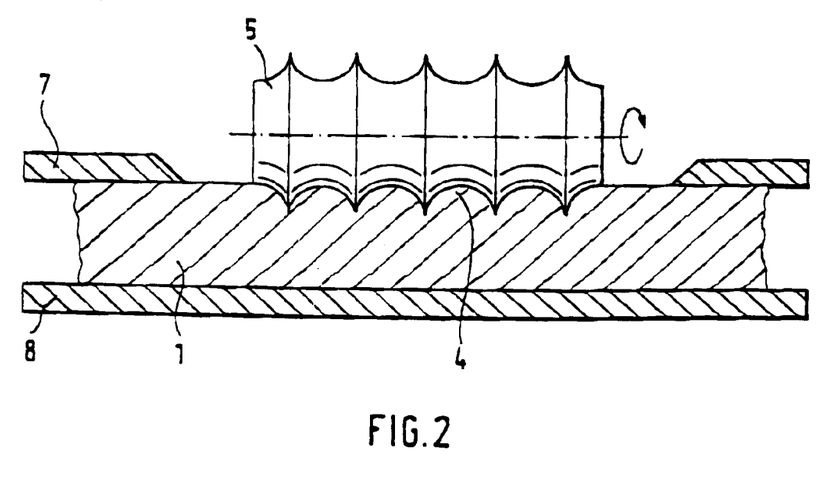
FIG. 2 shows a grinding apparatus for incorporating the lens structure into the data carrier in cross section.

FIG. 2 shows grinding cylinder 5 whose surface has the negative relief of lens structure 4 and with which data carrier 1 is brought in contact in the area of tilt image element 2. The data carrier is thereby placed between two position elements 7, 8, whereby one 7 of the elements has an opening in the area of lens structure 4 to be incorporated. The actual design of the positioning mechanism depends on the local circumstances and will be selected from known apparatuses in accordance with these requirements.

Figure 3A:
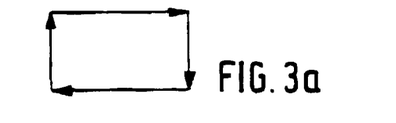
FIGS. 3a and 3b show a side view of the grinding apparatus with air cooling.
Figure 3B:
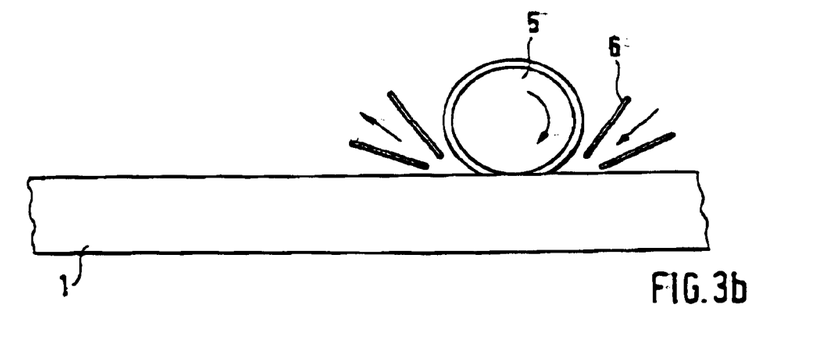
Figure 4:
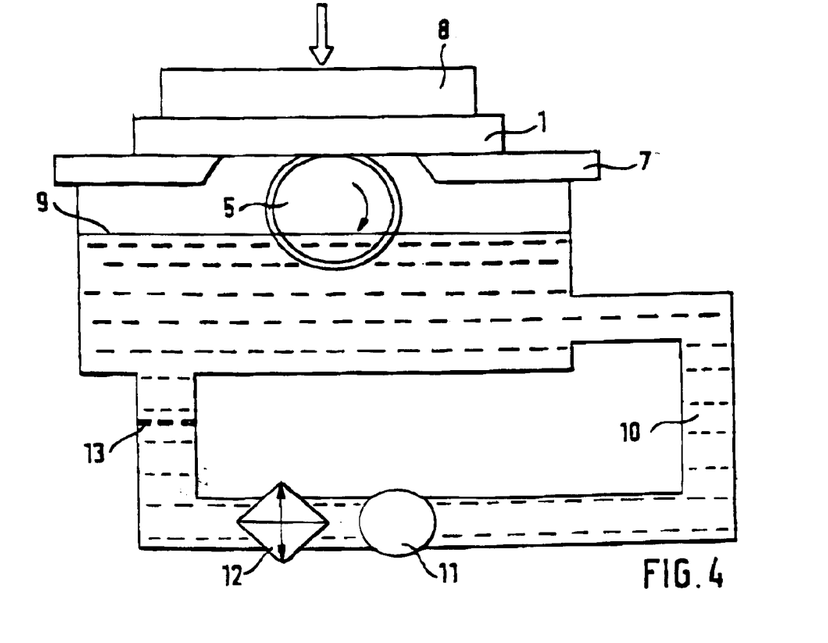
FIG. 4 shows a sketch of a wet grinding apparatus.

During the grinding process the processed data carrier area can additionally be cooled. FIGS. 3 and 4 shows relevant variants. Grinding cylinder 5 is moved over the data carrier in accordance with the motion cycle shown in FIG. 3a. Meanwhile, as shown in FIG. 3b, the area being processed is subjected to cool or cold air via air-pipe system 6 consisting for example of a nozzle or a simple pipe.

Alternatively one can also use a wet cooling system whose basic principle is shown in FIG. 4. Here, too, data carrier 1 is fixed in chucking device 7, 8. Grinding cylinder 5 is moved over the data carrier area as in the working cycle shown in FIG. 3a, and dips during grinding into grinding liquid 9, in the simplest case water, which provides for the necessary cooling. In order to permit dissipation of the arising heat, grinding liquid 9 is moved in a closed circuit via pipe system 10 with the aid of pump 11 and simultaneously cooled to the desired temperature again in cooling system 12. Filter element 13 additionally prevents grinding residue or the like from passing back into grinding bath 9.

If lens structure 4 is produced by planing using a profile chisel, however, it can also be necessary to heat the cutting tool in order to ensure good material removal.

Figure 5:
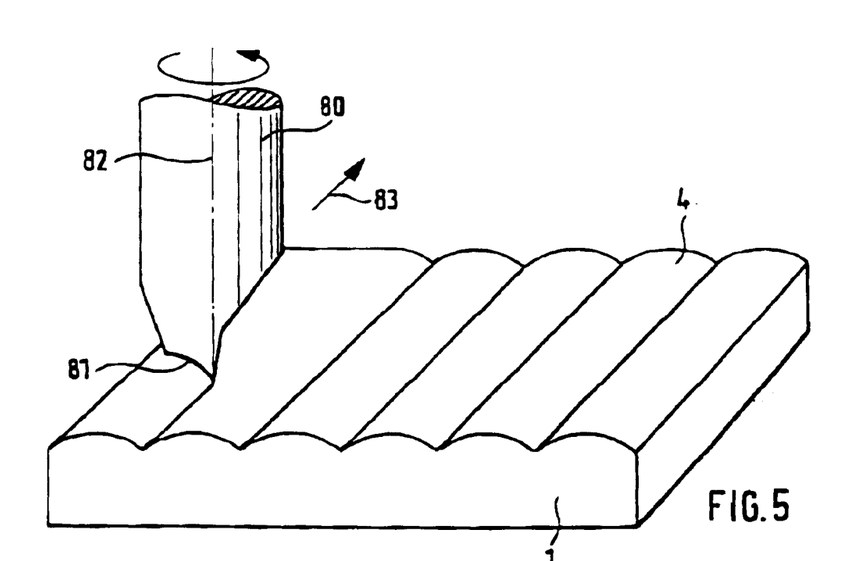
FIG. 5 shows a milling apparatus for incorporating the lens structure into the data carrier.

Another way of incorporating a lens structure into the data carrier using cutting methods is shown in FIG. 5. Cutting part 81 of milling tool 80 has the negative form of a quadrant here. During the milling process tool 80 rotates about axis 82 and is simultaneously moved linearly in the direction of arrow 83 in order to produce cylinder lenses 4. Cutting part 81 of milling tool 80 can alternatively be designed to be rotationally symmetric with respect to axis 82 so that milling part 81 has an umbrella-like form. Depending on the desired lens form, milling tool 80 can of course also have any other form. The geometrical design of the lens element is also freely selectable. In FIG. 5 the lens element extends over the entire data carrier, but it can also only be locally limited and executed with any contours via the control of the milling tool.

This method further offers the advantage that both single-card processing and processing in sheet form are possible. Moreover there is no temperature load.

Figure 6:
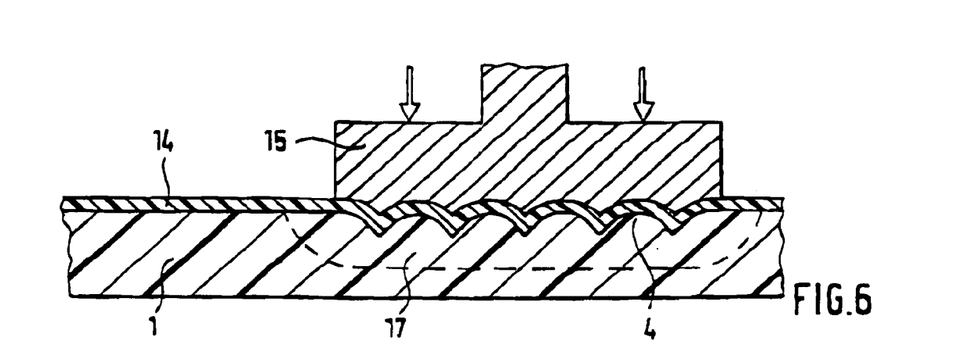
FIG. 6 shows a data carrier with a thin lacquer layer, the lacquer layer and data carrier being embossed.

In accordance with a further embodiment, data carrier 1 can be provided with thin lacquer layer 14 by any printing process, in particular screen printing, rotogravure or ink dabber printing. Lens structure 4 is then transferred with embossing die 15 both into lacquer layer 14 and into surface area 17 of data carrier 1 (FIG. 6). Lacquer layer 14 can thereby be printed either all over or only on a partial area of the data carrier. Depending on lacquer system 14 used, lacquer 14 can be precured before embossing, being put in a thermoplastic state. Complete curing of the lacquer finally takes place during or after embossing. One can use for example lacquer systems of chemically nonreactive components, the first component during physically or curing by thermal reaction and the second curing by radiation. The curing of the first component gives rise to the thermoplastic state necessary for embossing, which is only ended by the radiation-curing of the second component. However one can also use one-component, in a particular radiation-curing, lacquer systems. If curing takes place during the embossing process the embossing die must be transparent to the curing radiation, for example UV or IR radiation. Radiation source 16 can be disposed directly within embossing die 15, as shown in FIG. 7.

However one can also use delayed-curing lacquers. With these, the crosslinking process is initiated in the lacquer by radiation of suitable energy shortly before the embossing process. Complete crosslinking takes place with a time delay so that in the meantime one can emboss into the still soft material. If heat radiation is used, however, it suffices to heat the die to the necessary temperature. This method has the advantage that the data carrier material is not greatly stressed since less material need be displaced, which considerably reduces the danger of distortions. Further the embossing profile is fixed in lacquer layer 14 by radiation-curing virtually like a lacquer and consequently serves as a kind of fixing skin for the subjacent softened data carrier material, which can thus cool down without distortions after the embossing process.

Figure 7:
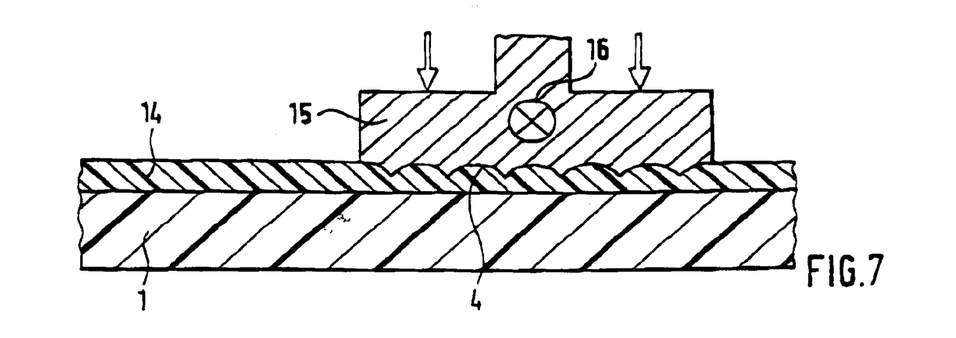
FIG. 7 shows a data carrier with a thin lacquer layer into which the lens structure is being embossed.

A further way of reducing the danger of distortions is offered by the method shown in FIG. 7. Here one embosses only into lacquer layer 14 applied to the data carrier all over or partially. In this case the data carrier material itself is not impaired by the embossing process so that neither distortions nor embossings through to the back of the data carrier can arise.

The individual data carriers are embossed according to the invention in a special embossing apparatus permitting parallel processing of individual data carriers. It is completely irrelevant whether or not the data carrier has been previously provided with a fixing lacquer layer, as described above. The special process run within the apparatus also permits embossing into the data carrier itself without distortion.

Figure 8:
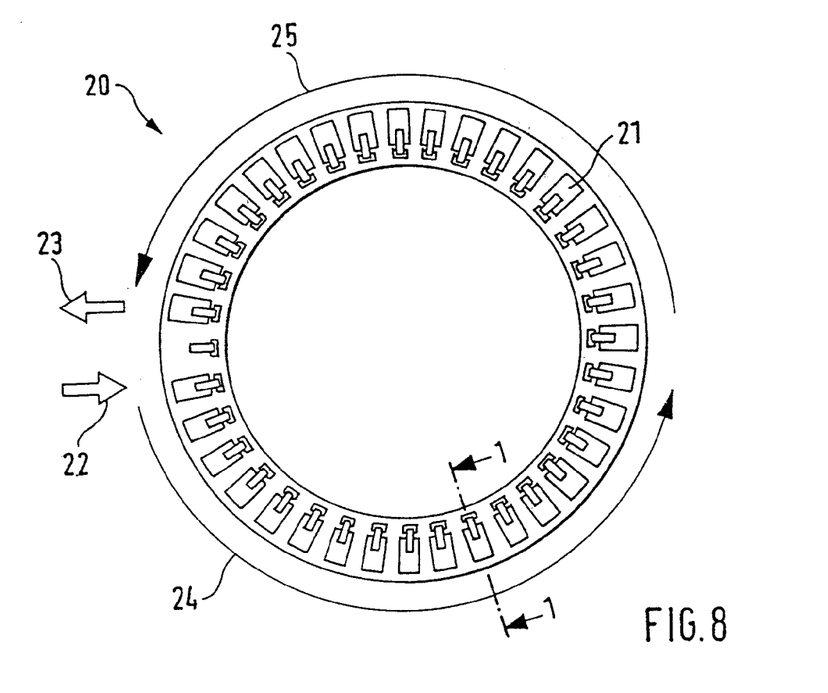
FIG. 8 shows an embossing apparatus with a multiplicity of individual embossing units.

FIG. 8 shows embossing apparatus 20 comprising a multiplicity of individual embossing units 21. The successively entering data carriers—schematically indicated in FIG. 8 by arrow 22—are received by individual embossing units 21, brought in contact with the embossing die located there, and moved back together with embossing unit 21 on a circular path to the starting point, where they leave embossing apparatus 20 again (arrow 23). The transport path can of course also have any other form. Also, the data carriers need not necessarily be transported back to the starting point.

During circulation of embossing units 21 the data carriers are heated slowly, provided simultaneously with the lens structure and finally cooled again very slowly. The very slow action of temperature and pressure virtually avoids any distortions. According to a first variant, the temperature change takes place separately in each embossing unit 21, i.e. the heating/cooling device is jointly moved with embossing unit 21 and heats and cools the embossing die present there according to a given temperature curve. Alternatively the heating/cooling device can also be stationary, whereby for example during transport embossing die and data carrier are heated slowly on path 24 and cooled down just as slowly along transport path 25. In this case, embossing unit 21 including the data carrier with the mounted embossing die is clocked through the heating/cooling device.

Figure 9:
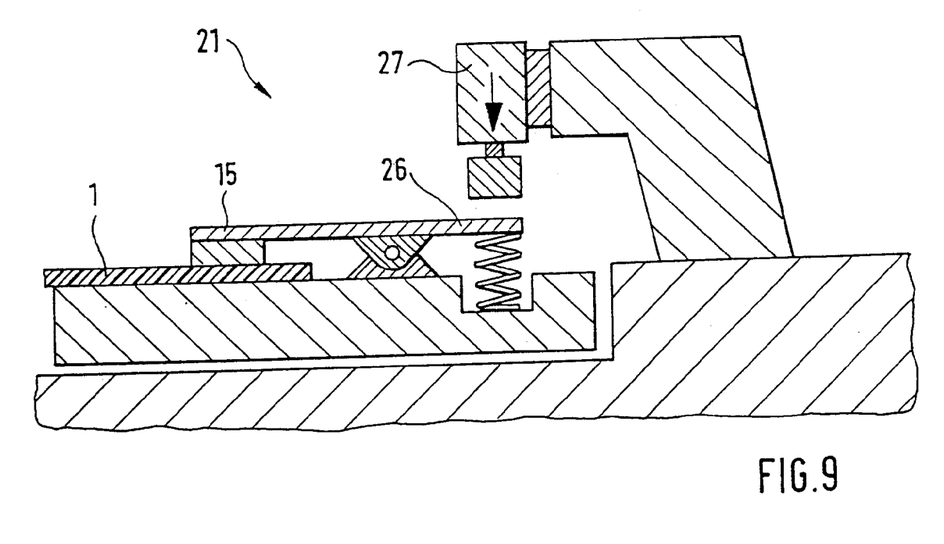
FIG. 9 shows a section through an individual embossing unit with a jointly moved heating/cooling apparatus.

FIG. 9 shows a section along line 1—1 through embossing unit 21 of apparatus 20. When data carrier 1 runs into embossing unit 21 embossing die 15 is mounted on data carrier 1 and fixed there by spring 26, as shown for example in FIG. 9. Conceivable alternatives are compressed air and electric or hydraulic chucking devices. The fixation is released only when the card leaves embossing unit 21. The action of temperature takes place via die 27, which is fastened in stationary fashion and passes on the heat to embossing die 15, which must of course be heat-conducting. With the next machine phase, embossing unit 21 is transported to next heating/cooling die 27. The basically very long process time is compensated by the fact that the data carriers can be processed singly and thus offset from one other. Only at the beginning of the production cycle is there a short processing gap that corresponds to the circulation time of one embossing unit 21. In the further course of production a data carrier leaves embossing apparatus 20 with each machine phase, as if it had been embossed during one machine phase. On the other hand, the actual process time including a multiplicity of machine phases permits distortion-free production of data carriers, in particular data carriers in which the apex areas of the lens structure are flush with the data carrier surface or slightly sunk in from the surface.

Figure 10:
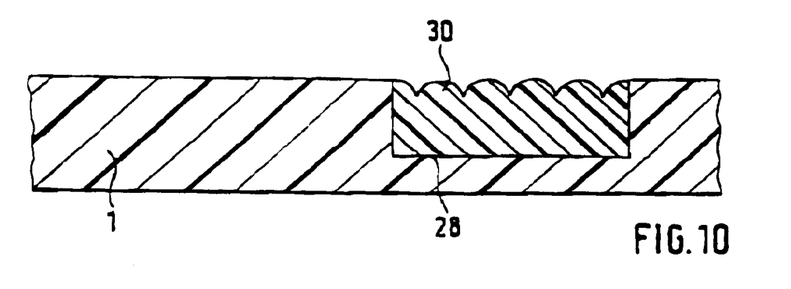
FIG. 10 shows a data carrier with a gap into which a single element is incorporated.
Figure 11:
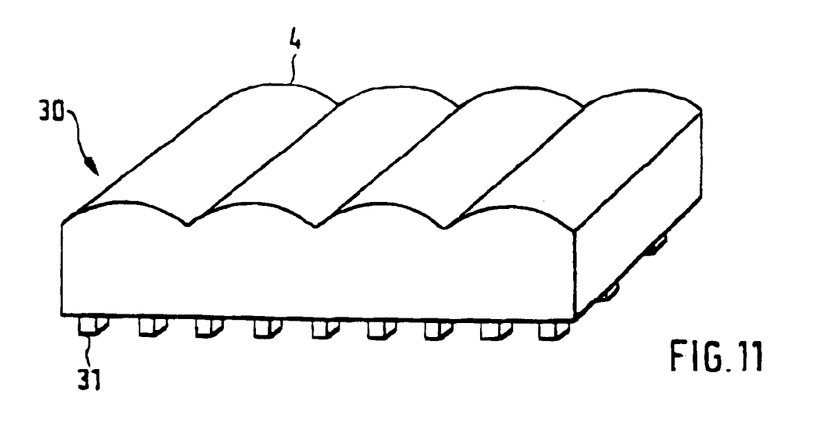
FIG. 11 shows a single element with a lens structure.

A further inventive embodiment is shown in FIG. 10. Here data carrier 1 is provided with gap 28, for example by milling or suitably injection molding data carrier 1. Separately produced single element 30 is inserted into this gap and connected with data carrier 1 by gluing or welding. If single element 30 is welded to data carrier 1 by ultrasonic irradiation, directors 31 must be provided on single element 30, for example in the form of knobs or strips, that focus the impinging radiation, locally heat the material and thus permit controlled welding (FIG. 11). Directors 31 are made of the same plastic material as element 30 and can therefore be produced very advantageously together with the element by injection molding.

Figure 12:
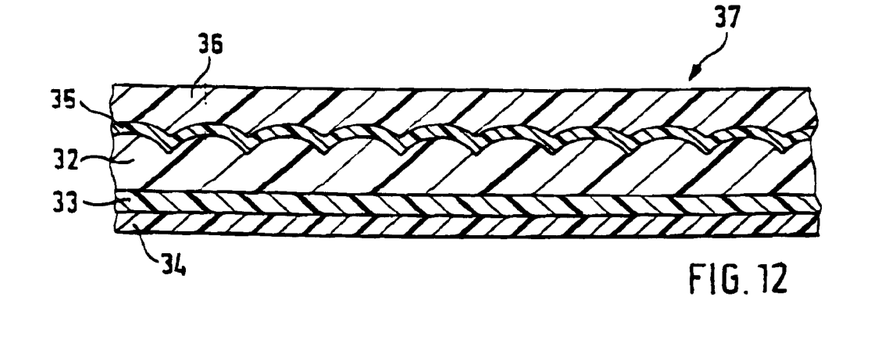
FIG. 12 shows an embossed foil for producing single elements.

Another way of producing single elements is to emboss endless foils which are then cut into suitable single elements. FIG. 12 shows the layer structure of such an endless foil 37. Self-supporting plastic foil 32 is embossed with lens structure 4 or already extruded with the lens structure. The underside of embossed foil 32 is provided with adhesive layer 33, that can possibly be covered with silicone layer 34. The embossed side of foil 32 receives separation layer 35 and cover layer 36 disposed thereabove to protect the lens structure from damage during storage or the punching process. Cover layer 36 can be knife-coated in a liquid state and then cured. It is of course likewise conceivable to provide embossing 4 only in certain partial areas of foil 32.

Endless foil 37 has the advantage that it can be cost-effectively produced independently of the data carrier production and cut up into single elements of any format. For transfer to the data carrier, foil 32 is either prepunched or punched directly during transfer. Cover 36 is then removed together with the nonsticking foil remnants.

The single elements of course do not necessarily have to be inserted into a gap but can alternatively be glued or welded on the data carrier surface.

Figure 13:
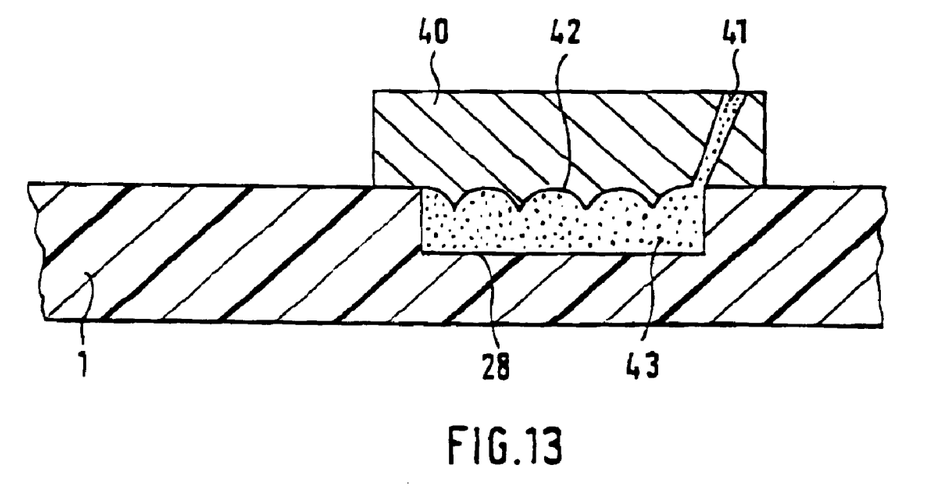
FIG. 13 shows the application of a lens structure element by the inmold technique.

A further variant for providing a card with a single element is shown in FIG. 13. In this case gap 28 is incorporated into card 1 as in the method shown in FIG. 10. Then the lens element is injected into gap 28 by the inmold technique, i.e. instead of prefabricating an implantable single element one injects the desired element form directly into gap 28 in card 1 or onto the card surface. Card 1 provided with gap 28 is thereby introduced into an injection molding apparatus. For reasons of clarity FIG. 12 shows only mold 40, which must of course have negative lens structure 42. Via nozzle 41 transparent element material 43 is then injected into gap 28. As casting materials one can use thermoplastics or light-curing, in particular UV-curing, plastics for example.

According to a further variant the mold can also be designed such that the lens structure does not end flush with the plane of the data carrier surface but protrudes beyond it for example.

Figure 14:
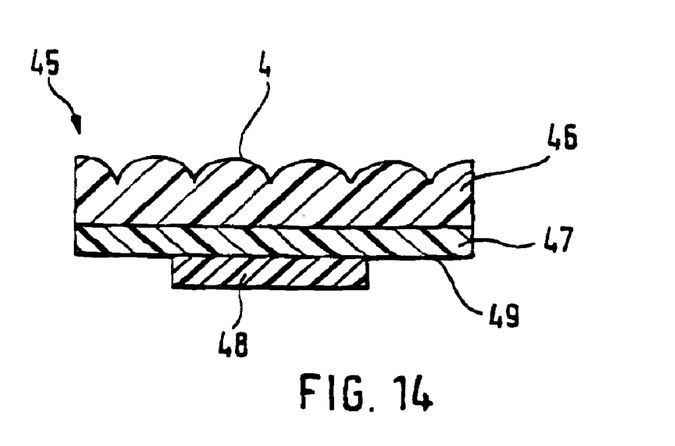
FIG. 14 shows a variant of a single element with a lens structure.

Single element 45 shown in FIG. 14 has a somewhat more complicated structure than that shown in FIG. 11. It consists of three plastic layers with different properties. Upper layers 46 and 47 are transparent and differ in particular with respect to their absorption properties for laser radiation. Plastic layer 46 is largely transparent to the laser radiation used for inscribing the element while plastic layer 47 is very sensitive to laser radiation, i.e. the action of laser radiation causes a visually recognizable color change in plastic layer 47. The different sensitivity to laser radiation can be caused for example by suitably doping the plastic layers with carbon black particles, a higher doping being synonymous with a faster change of the plastic. In order to facilitate the laser inscription of element 45 one disposes opaque layer 48 below layer 47. In the shown example it is only present in the central area of element 45, but it can also be provided all over layer 47. However if edge areas 49 remain free they facilitate the attachment of element 45 to data carrier 1. It is also conceivable to do completely without layer 48 so that the element has only a two-layer structure.

Element 45 can be produced in different ways. It is for example possible to produce single element 45 directly by injection molding. Alternatively it is possible to punch element 45 out of an endless two- or three-layer foil structure. In this case, two- or three-layer foil structure 46, 47, 48 is first produced in endless form by known methods, such as coextrusion or lamination, and provided with lens embossing 4. Embossing can be done either all over or at certain intervals. Then the surplus areas of foil 48 are milled out so that areas 49 arise. It is also possible, however, to mill into all three layers 46, 47, 48 so that areas 49 are present in layer 46. Finally single element 45 is punched out of the endless band, whereby this process can take place during sticking to data carrier 1. Element 45 can of course have any geometries, but it preferably has a round or rectangular form.

Figure 17A:
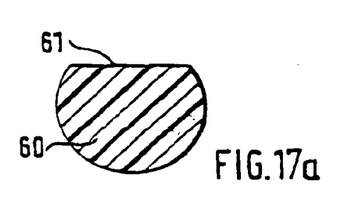
FIGS. 17a and 17b show a single data carrier with a gap and a corresponding single element.
Figure 17B:
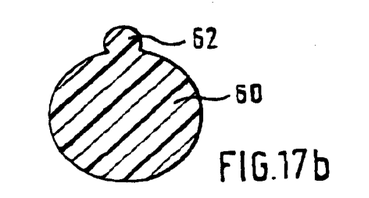

If the element has a round form, it can be provided with an additional marking in order to permit exact positioning of the element in the card. FIGS. 17*a* and 17*b* show two variants of such a register mark. According to FIG. 17*a* this can be flattened area 61 of element 60. It is likewise conceivable to use bulge 62, as shown in FIG. 17*b*. The card gap of course has an accordingly adapted form.

Figure 15:
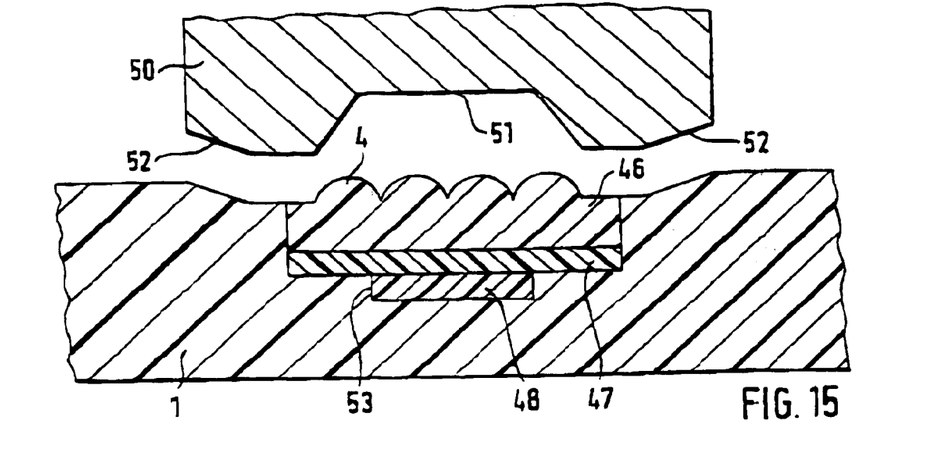
FIG. 15 shows a data carrier with the laminated-in single element according to FIG. 14 and the heated die used for incorporation.

Element 45 is finally inserted into accordingly formed gap 53 in data carrier 1 and connected inseparably therewith. FIG. 15 schematically shows element 45 already laminated into data carrier 1 and heated die 50 in their mutual spatial arrangement.

During the laminating process heated die 50 lies on the data carrier/element compound only in the boundary area between data carrier 1 and element 45. In the central area of element 45, however, die 50 has gap 51 which protects lens structure 4 from destruction during the laminating process. Since the data carrier material and the material of element 45 soften through the action of heat and pressure and flow into cavities existing between data carrier 1 and element 45, a smooth surface structure arises in the contact area of die 50, preventing element 45 from being detached from data carrier 1 and inserted into another data carrier. Simultaneously an inseparable compound arises between data carrier 1 and element 45 in the area of the gap below die 50 (an annular area here), since in the area of the heated die the data carrier material and the element material soften down to the level of areas 49. Lens structure 4 is largely destroyed in the contact area of die 50 by the laminating process. The compound area extending about element 45 has a mere width of about 1 to 2 mm, however, so that only a small part of the lens structure is destroyed. Further, distortions during lamination of the data carrier can be prevented by the smaller contact surface of the die. Die 50 can be smooth, matt or superficially structured in another way in the compound area in order to hide the contour of the transition between element 45 and card body. Further the die can have an antistick coating in order to prevent sticking between die and card material. It is alternatively possible to use a silicone-coated foil as an intermediate layer. To avoid material accumulations in the edge area of die 50 that can arise through displacement of the material upon pressurization, the die has the form of a facet in this area 52.

The compound between data carrier 1 and element 45 can be improved additionally by providing opaque layer 48 with an adhesive layer. The adhesive layer can also be provided before production of the single element as an all-over fourth layer during production of the foil structure. An adhesive can be necessary especially when the element takes up a very great surface. Use of an adhesive also makes it possible to use different polymeric materials for data carrier and element, such as an especially elastic or readily deformable material for the single element and polycarbonate or PETG for the data carrier.

An alternative embodiment is to do completely without lamination and use a two-component adhesive. One component is thereby put in the gap and the second component on the element.

Figure 16:
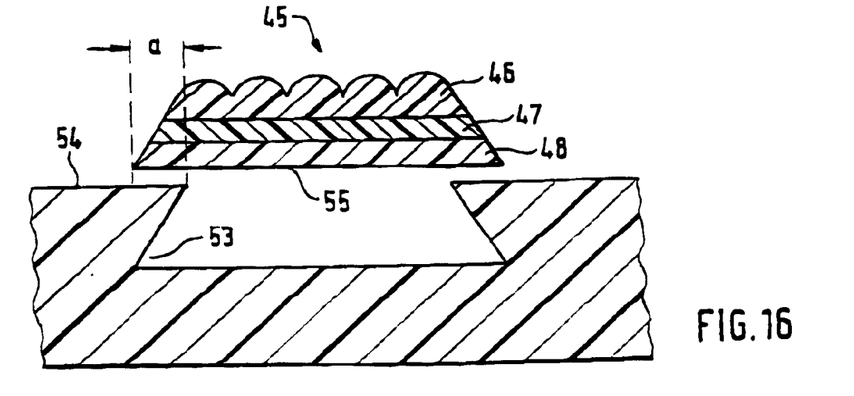
FIG. 16 shows a data carrier with a gap and a corresponding single element.

According to a further embodiment, element 45 and gap 53 can have trapezoidal side contours (FIG. 16). Gap 53 and element 45 are coordinated with each other in form such that the element snaps into gap 53 when inserted into the card, resulting in an additional anchoring of the element in the card. For the sake of clarity, overlap area a between data carrier surface 54 and element underside 55 is shown greatly exaggerated. In reality, overlap area a is in the range of a few 100 microns. After insertion in the card the element is laminated or stuck to the card body, as already described with reference to FIG. 15.

Figure 18:
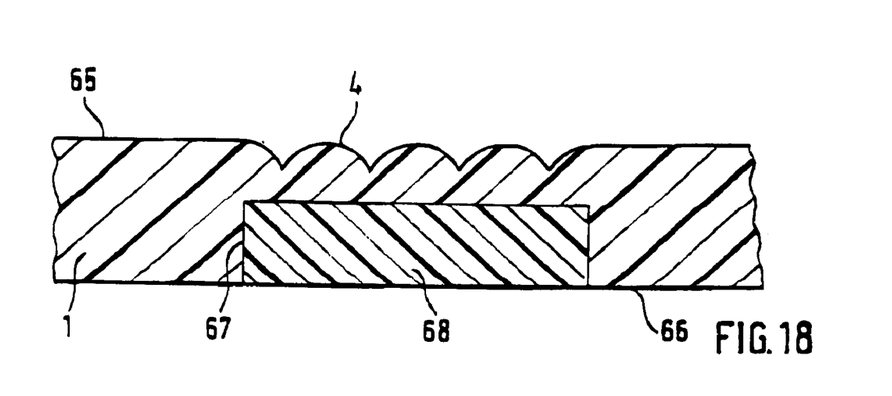
FIG. 18 shows a further variant of a data carrier with a gap and an inserted separate element.

According to the embodiment shown in FIG. 18, data carrier 1 can also have lens structure 4. In this case data carrier 1 is produced as an injection molded part having lens structure 4 on one 65 of its surfaces. Surface 66 opposite lens structure 4 is provided with gap 67 in which element 68 is inserted. The injection molded part of data carrier 1 consists of transparent or translucent material, whereas inserted element 68 can be transparent or opaque and be punched out of a foil or likewise produced by injection molding. Element 68 can be coordinated specifically to the needs of laser inscription on the inner side facing the card body. The inside surface can be printed for example with a sensitive layer absorbing laser radiation, in which laser beam action produces black marks contrasting with the surroundings. Above this lacquer layer containing additives absorbing laser radiation one can dispose a layer transparent or less sensitive to laser radiation which ensures a good compound with the data carrier. Alternatively the plastic material of the element can be mixed at least partially with additives which absorb laser radiation. For example only the surface area of the element facing the card body could be sensitized to laser inscription.

Figure 19:
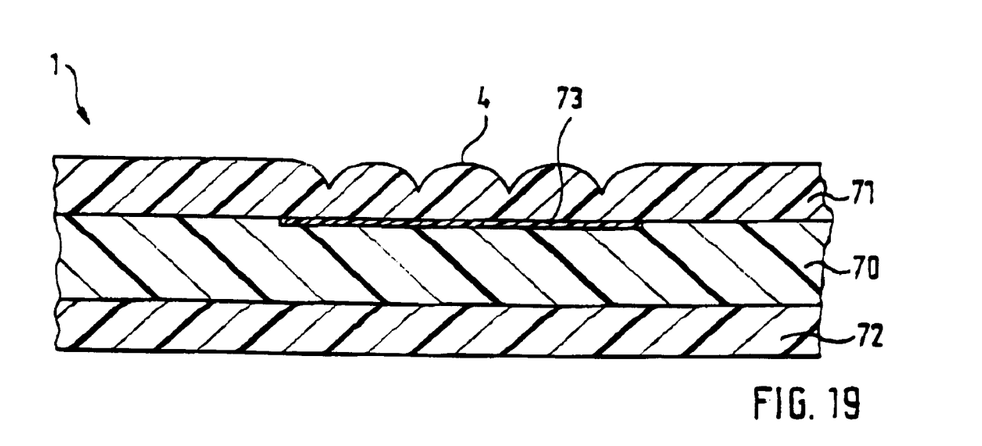
FIG. 19 shows a further embodiment of the inventive data carrier.

FIG. 19 shows another solution to the inventive problem. Here data carrier 1 consists of opaque foil inlay 70 which is provided on both sides with transparent cover layers 71, 72 by injection molding. One 71 of these layers receives lens structure 4 locally or all over in the course of injection molding. Below lens area 4 one can provide on the foil inlay layer 73 sensitive to laser inscription, for example in the form of a transparent, accordingly prepared lacquer layer.

Figure 20:
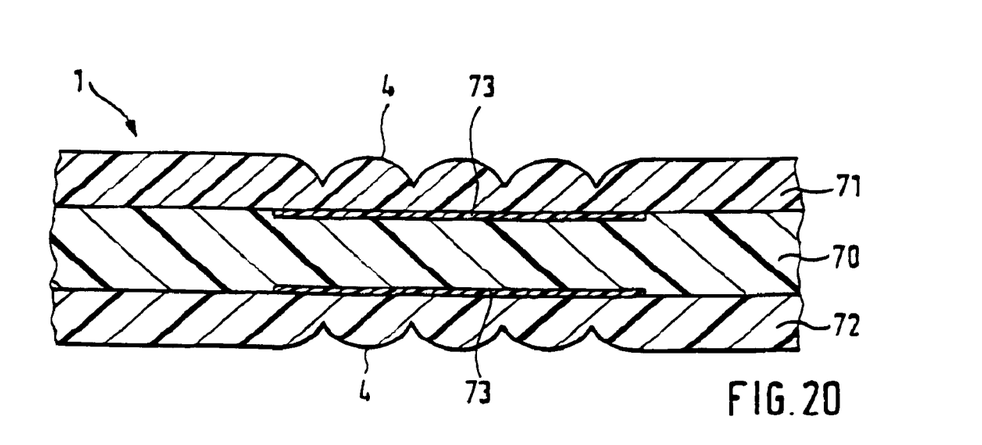
FIG. 20 shows a variant of the data carrier shown in FIG. 19.

According to a variant, data carrier 1 can also be provided with lens structure 4 and subjacent laser-sensitive layer 73 on both sides (FIG. 20). The lens structure areas need not necessarily be disposed congruently to each other but can be disposed at different places and with any different outline structures.

In the data carriers shown in FIGS. 18 to 20, as in most of the other embodiments of the invention, the lens structure is flush with the surface of the card, thereby avoiding any problems arising from different card thickness when the cards are stacked.

After the data carrier has been provided with a lens structure by one of the inventive methods, it is supplied to a laser inscription unit. There the tilt image information is inscribed into the transparent material through the lens structure. Inscription expediently takes place in the course of the necessary personalization of the data carrier, so that if desired an individual data record for each user consisting of data to be lasered directly into the data carrier and tilt image information, that might likewise be user-related, can be put together and delivered to the laser control. In the case of an inscription error the faulty data carrier can be immediately eliminated and replaced with a following, as yet uninscribed data carrier with a lens structure.

The material provided with the lens structure must of course be transparent at least in the area of the lenses so that the information incorporated through the lenses is legible. Transparent materials are preferably used. It is also possible, however, to use colored translucent plastics.

What is claimed is:

1. A data carrier comprising:
   a. two opposite exterior major surfaces exposed to an outside of the data carrier;
   b. a lens structure portion in one of the exterior major surfaces of the data carrier, said lens structure portion including lenses made of a transparent material;
   c. a non-lens structure portion defined by a plane of said one of the exterior major surfaces other than the lens structure portion;
   d. marks or patterns visible through the lens structure portion, wherein the lens structure portion has an exterior surface that includes indentations and apexes, and wherein the apexes of the lens structure portion do not protrude beyond the plane of the non-lens structure portion, such that the apexes are even with said plane of said one of the exterior major surfaces or are sunk in below said plane of said one of the exterior major surfaces.

2. A data carrier according to claim 1, wherein the lens structure portion is provided in a transparent plastic layer extending over the entire data carrier.

3. A data carrier according to claim 1, wherein the lens structure portion is provided in a transparent plastic layer executed as a self-supporting single element which is connected with the data carrier.

4. A data carrier according to claim 3, wherein the single element consists of plastic layers with different absorption behavior for laser radiation.

5. A data carrier according to claim 3, wherein the single element is disposed in a gap in the data carrier, the gap has a step-shaped design, and the element has a corresponding step-shaped design.

6. A data carrier according to claim 5, wherein the gap has a step-shaped design and the element has a corresponding step-shaped design.

7. A data carrier according to claim 1, wherein the lens structure portion consists of cylinder and/or spherical lenses disposed in the form of any pattern.

8. A data carrier according to claim 1, wherein the data carrier includes a deformable lacquer layer and a plastic foil directly adjoining a plastic layer, and the lens structure portion is present both in the deformable lacquer layer and in the adjoining foil.

9. A data carrier according to claim 1, wherein the apparatus has at least one unit with a cutting tool, and the tool is brought in contact with the data carrier completed at least with respect to its layer structure in order to produce the surface relief, the cutting tool having the negative relief of the lens structure to be produced.

10. A data carrier according to claim 9, wherein the cutting tool is a plane, a grinding device, a milling tool or a grinding cylinder.

11. A data carrier according to claim 10, wherein the apparatus has an air cooling device which cools the data carrier area being processed.

12. A data carrier according to claim 10, wherein the cutting tool is a wet grinding device.

13. An apparatus for producing a data carrier according to claim 1, wherein the apparatus has at least one unit with a cutting tool, and the tool is brought in contact with the data carrier completed at least with respect to its layer structure in order to produce a surface relief and thereby form said lens structure portion, the cutting tool being a profile chisel and means being provided for heating the profile chisel or the data carrier.

14. An apparatus according to claim 13, wherein the cutting tool is a cutting part of a milling tool arranged to rotate and move linearly so as to produce cylinder lenses.

15. A data carrier according to claim 13, wherein the apparatus has an air cooling device which cools the data carrier area being processed.

16. A data carrier according to claim 13, wherein the cutting tool is a wet grinding device.

17. A data carrier according to claim 1, wherein the lens structure portion is incorporated into a plastic layer by cutting methods.

18. A data carrier according to claim 17, wherein the surface structure is incorporated by grinding, planing or milling.

19. A data carrier according to claim 17, wherein a data carrier area in which the lens structure portion is incorporated into the plastic layer is additionally cooled.

20. A data carrier according to claim 19, wherein cooling is done with air or a grinding liquid.

21. A data carrier according to claim 17, wherein the surface structure is incorporated with a profile chisel.

22. A data carrier according to claim 21, wherein the profile chisel is heated.

* * * * *